(12) United States Patent
Geiger (10) Patent No.: US 7,112,010 B1
(45) Date of Patent: Sep. 26, 2006

(54) APPARATUS, SYSTEMS AND METHODS FOR ERECTING AN OFFSHORE WIND TURBINE ASSEMBLY

(76) Inventor: William Clyde Geiger, 3010 Candle Bend Dr., Spring, TX (US) 77388

( * ) Notice: Subject to any disclaimer, the term of this patent is extended or adjusted under 35 U.S.C. 154(b) by 0 days.

(21) Appl. No.: 11/006,963

(22) Filed: Dec. 8, 2004

Related U.S. Application Data (60) Provisional application No. 60/528,304, filed on Dec. 10, 2003, provisional application No. 60/546,813, filed on Feb. 20, 2004.

(51) Int. Cl.
*E02B 17/00* (2006.01)
(52) U.S. Cl. .................... 405/195.1; 405/203
(58) Field of Classification Search ........... 405/195.1, 405/203, 204
See application file for complete search history.

(56) References Cited

U.S. PATENT DOCUMENTS

| | | | |
|---|---|---|---|
| 2004/0045226 A1* | 3/2004 | Dehlsen et al. | 52/71 |
| 2004/0169376 A1* | 9/2004 | Ruer et al. | 290/55 |
| 2004/0262926 A1* | 12/2004 | Hansen | 290/44 |

FOREIGN PATENT DOCUMENTS

| | | | |
|---|---|---|---|
| EP | 1101935 | * | 5/2001 |
| GB | 2378679 | * | 2/2003 |
| GB | 2394498 | * | 4/2004 |
| GB | 2407114 | * | 4/2005 |
| WO | 02/48547 | * | 6/2002 |

OTHER PUBLICATIONS

Toby Bailey, Emerging Technology for Renewable Offshore Power Generation, Ocean News & Technology Magazine, Sep./Oct. 2003, pp. 50-52.

* cited by examiner

*Primary Examiner*—Frederick L. Lagman
(74) *Attorney, Agent, or Firm*—E. Randall Smith; Jones & Smith, LLP (57) ABSTRACT

An embodiment of an apparatus useful for up-righting a wind turbine pillar at an offshore installation location includes a barge having first and second towers and an open area therebetween and which extends downwardly to the offshore installation location. At least two pulling lines extend from the towers to the pillar and are useful to assist in moving the pillar into a generally up-right orientation between the towers and lowering the pillar downwardly through the open area to the offshore installation location.

25 Claims, 6 Drawing Sheets

APPARATUS, SYSTEMS AND METHODS FOR ERECTING AN OFFSHORE WIND TURBINE ASSEMBLY

This application claims the benefit of U.S. Provisional Patent Application Ser. No. 60/528,304 filed on Dec. 10, 2003 and entitled "Apparatus & Methods for Up-righting an Offshore Wind Turbine Assembly" and U.S. Provisional Patent Application Ser. No. 60/546,813 filed on Feb. 20, 2004 and entitled "Apparatus & Method for Uprighting an Offshore Wind Turbine Assembly".

BACKGROUND OF THE INVENTION

The present invention involves apparatus, systems and methods for erecting wind turbine assemblies at offshore locations.

The use of offshore wind turbines is becoming an increasingly feasible and desirable form of power generation. In implementing the concept of windmills, the larger the turbine rotor, the more power generated. Thus, massive structures are being contemplated and built.

Some of the challenges associated with this technology involve the installation of huge wind turbine structures at offshore locations. Currently available seagoing vessels and techniques are not believed not to be well-suited or cost effective for handling and installing these structures. For example, current technology would require the use of a very heavy and long stick-lift vessel or multiple lifting/loading vessels. For another example, lifting a fully assembled turbine assembly with existing technology would place unacceptable levels stress on the turbine nacelle. If installed separately with existing techniques, the turbine rotor and nacelle would necessarily be installed at heights unfamiliar in the offshore industry.

It should be noted that the above-described concerns are only examples and may vary depending upon the situation. Moreover, there may be other or different concerns. Merely by mentioning the above concerns, it is not intended that each claim of this patent be limited to address or exclude each such concern. Accordingly, none of the appended claims should be limited in any way by the above discussion, or construed to address or exclude the cited concerns, except and only to the extent as may be expressly stated in a particular claim.

There remains a need for apparatus, systems and methods having one or more of the following attributes, capabilities or features: solves problems associated with installing offshore wind turbines caused by existing methods and apparatus; provides for installation of a fully or partially assembled offshore wind turbine without the need for performing a dual lift, utilizing a very heavy and long stick-lift vessel, placing undue stress on the turbine nacelle during lifting (necessitating the need for spreader bars, etc.), or any combination thereof; eliminates the need for a specialized derrick barge for lifting and installing offshore wind turbines; significantly reduces installation time of offshore wind turbines; uses a pin-assisted up-righting method rather than a conventional lift; prevents out-of-plane loading and excessive stress on components during up-righting; allows the use of a single simple barge for performing foundation installation, turbine transport, erection and final fit-out including weld out, electrical installation and installation of ancillaries, repair, maintenance and removal of wind turbines, or any combination thereof; saves significant expense associated with up-righting offshore wind turbines; provides a simple and cost effective apparatus, system and method for offshore up-righting of wind turbines; provides effective offshore wind turbine installation with the use of existing equipment and/or removable components; or any combination thereof.

BRIEF SUMMARY OF THE INVENTION

Some embodiments of the present invention involve an apparatus useful for up-righting a wind turbine assembly at an offshore installation location. These embodiments include a barge having first and second towers disposed on opposing sides of the barge at one end of the barge. An open area disposed between the towers extends downwardly to the offshore installation location. At least two pulling lines are each engageable between at least one of the towers and at least part of the wind turbine assembly. The pulling lines are useful to assist in moving at least part of the wind turbine assembly into a generally up-right orientation between the towers and lowering the wind turbine assembly downwardly through the open area to the offshore installation location.

Various embodiments of the present invention involve a system useful for assisting in up-righting an elongated wind turbine pillar at an offshore location on a floating vessel having at least one tower. These embodiments include at least two pins, each pin having a coupler at each end. Each pin extends through and is rotatable within a passageway in the turbine pillar. Each passageway is disposed in the pillar at a different height of the pillar. These embodiments also include at least two pulling lines. Each pulling line is engageable between a different coupler of the pins and a tower. The pulling lines are useful to assist in moving the pillar into a generally up-right position at the offshore location.

The present invention includes embodiments of a method for installing a wind turbine assembly at an offshore installation location from a barge. These embodiments include forming first and second towers on opposing sides of the barge at one end of the barge and forming an open area between the towers that extends downwardly to the offshore installation location. The wind turbine pillar is placed on the barge in a non-upright position and at least one pulling line is engaged between each tower and the turbine pillar. The pulling line(s) are pulled to draw the turbine pillar into a generally up-right position between the towers and in or over the open area. The turbine pillar is lowered to the offshore installation location.

Accordingly, the present invention includes features and advantages which are believed to enable it to advance the technology relating to installing offshore wind turbine assemblies. Characteristics and advantages of the present invention described above and additional features and benefits will be readily apparent to those skilled in the art upon consideration of the following detailed description of preferred embodiments and referring to the accompanying drawings.

BRIEF DESCRIPTION OF THE DRAWINGS

For a detailed description of sample embodiments of the invention, reference will now be made to the accompanying drawings wherein.

DETAILED DESCRIPTION OF PREFERRED EMBODIMENTS OF THE INVENTION

Presently preferred embodiments of the invention are shown in the above-identified figures and described in detail below. It should be understood that the appended drawings and description herein are of preferred embodiments and are not intended to limit the invention or the appended claims. On the contrary, the intention is to cover all modifications, equivalents, and alternatives falling within the spirit and scope of the invention as defined by the appended claims. In showing and describing the preferred embodiments, common or similar features are indicated by like or identical reference numerals or, in the absence of a reference numeral, are evident based upon the appended drawings and/or description herein. The figures are not necessarily to scale and certain features and certain views of the figures may be shown exaggerated in scale or in schematic in the interest of clarity and conciseness.

The terms "present invention", "invention" and variations thereof, as used throughout this patent and in the headings herein, mean one or more possible embodiment of the invention. These terms are not intended and should not be construed to mean or refer to the "claimed invention" of all, or any particular, claim(s) of this or any other patent or patent application. Thus, the subject matter referred to in the context of the terms "present invention", "invention" and variations thereof herein is not intended to and should not limit, or be required for, any of the claims merely because of such reference. For example, the BRIEF SUMMARY OF THE INVENTION and DETAILED DESCRIPTION OF PREFERRED EMBODIMENTS OF THE INVENTION sections of this patent discuss non-limiting examples, or embodiments, of the invention. Such discussions and the details thereof are not intended and should not be construed to be required by any claim(s) unless and only to the extent expressly required in the claim(s).

Figure 1:
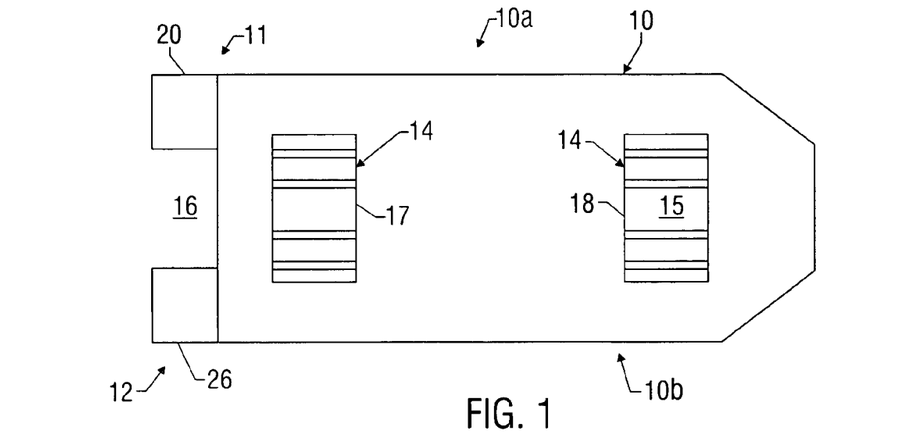
FIG. 1 is a plan view of an embodiment of an apparatus for up-righting an offshore wind turbine assembly in accordance with the present invention.
Figure 2:
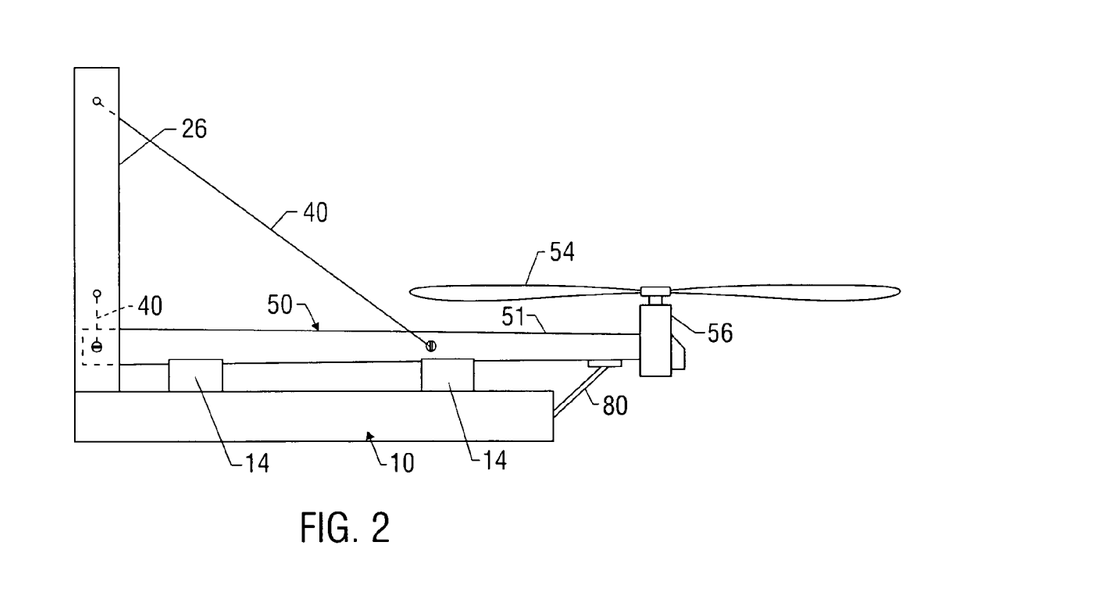
FIG. 2 is a side elevation view of the embodiment of FIG. 1.

Referring initially to FIGS. 1 and 2, in accordance with one embodiment of the present invention, an up-righting barge 10 is shown having first and second up-righting towers 20, 26 extending upwardly from adjacent corners 11, 12 of the barge 10 and an open area 16 provided therebetween. The towers 20, 26 along with at least one pulling line 40 are used to assist in up-righting at least part of a wind turbine assembly 50 at a desired offshore location (not shown).

The illustrated wind turbine assembly 50 includes a pillar 51, rotor 54 and nacelle 56. However, the turbine assembly 50 may have any desired components. Moreover, the type and configuration, construction and components of the turbine assembly 50 are not limiting upon the present invention.

The towers 20, 26 and pulling line(s) 40 may take any form, construction, configuration and operation suitable for assisting in up-righting the turbine assembly 50 from the barge 10 and positioning it in or over the open area 16 at the desired offshore location. For example, the towers 20, 26 may be fabricated from steel with a lattice or box-type construction for allowing connection with and operation of the pulling lines 40. The pulling lines 40 may, for example, be braided steel wire having a diameter of between approximately 4–6 inches. However, the towers 20, 26 and pulling lines 40 are in no way limited to such details. Further, there may be instances where only one tower is included.

Figure 3:
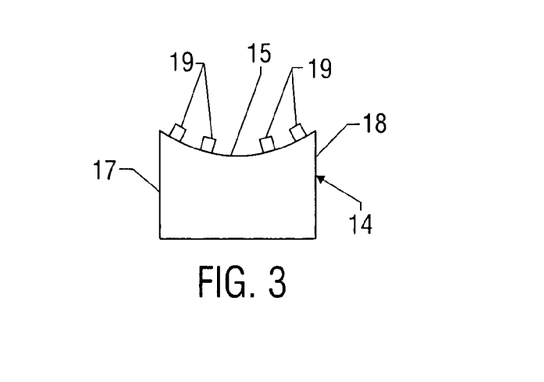
FIG. 3 is an isolated view of the embodiment of the turbine holder shown in FIG. 1.

The embodiment of FIGS. 1 and 2 also includes at least one turbine holder 14 capable of carrying, or supporting, the turbine assembly 50 during transport. While two holders 14 are shown in this example, the present invention may include any quantity of turbine holders 14. In this example, the holder 14 is a cradle 17 located generally equidistant from the sides 10a, 10b of the barge 10 and which provides a stable rest for the turbine assembly 50 positioned horizontally on the barge 10 with its turbine rotor 54 facing upwardly for transport. The cradle 17 may take any form, construction and configuration suitable for providing a stable rest for the turbine assembly 50 on the barge 10. For example, as shown in FIG. 3, the cradle 17 may be a pedestal-type stand 18 having a curved-shaped top surface 15 with small rollers 19. The cradle 17 may be welded onto the barge 10, installed on rails (not shown) to assist in allowing the turbine assembly 50 to be rolled onto the cradle 17 during loading, or have any other suitable construction and configuration.

Figure 10:
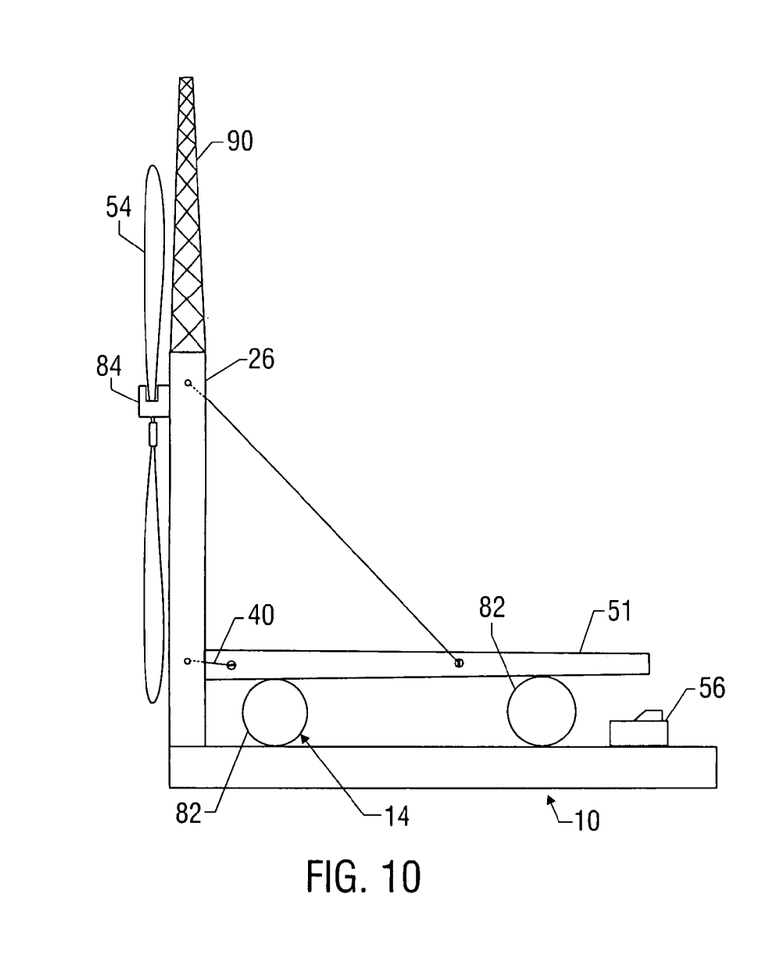
FIG. 10 is a side view of another embodiment of an apparatus for up-righting an offshore wind turbine assembly in accordance with the present invention.

In other embodiments, such as the example of FIG. 10, the turbine holder 14 may be one or more roller 82 disposed on the barge 10. The rollers 82 may have any suitable form, construction, configuration and operation. The use of rollers 82 may facilitate faster loading of the turbine assembly 50 onto the barge 10. It should be understood, however, that the present invention does not require the use of turbine holders 14 or any of the details of the cradle 17 or rollers 82 provided herein or shown in the attached Figures, except and only to the extent as may be expressly required in any appended claims.

Figure 4:
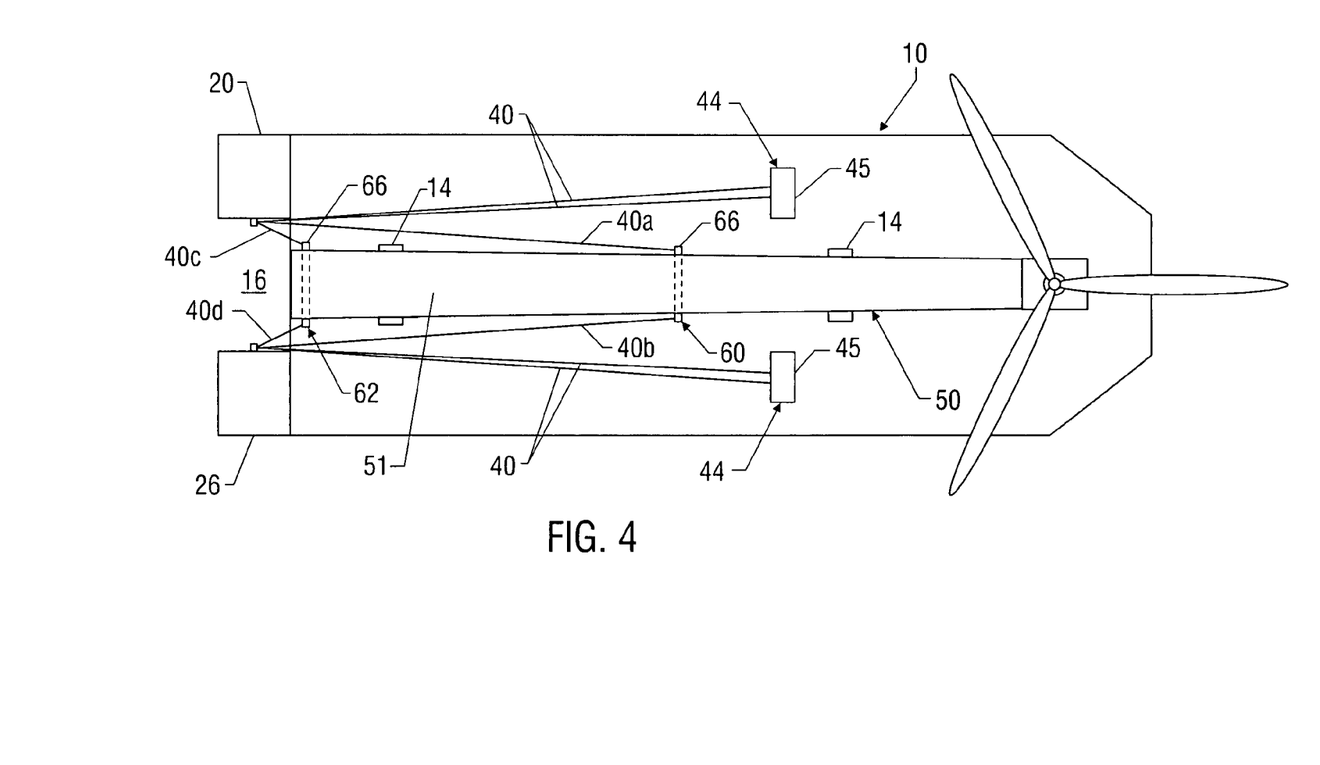
FIG. 4 is a plan view of another embodiment of an apparatus for up-righting an offshore wind turbine assembly in accordance with the present invention.

Referring now to FIG. 4, an embodiment of a barge 10 having four pulling lines 40 is shown. Each line 40 is extendable from a line holding, or pulling, device 44 at one end, to one of the towers 20, 26 and to the turbine assembly 50 at its other end. The line pulling devices 44 may be any suitable mechanisms, such as winches 45 located on the barge 10. In other embodiments, line pulling devices 44 may not be included.

In this example, upper pulling lines 40a, 40b extend to an upper location on the respective tower 20, 26 and turbine assembly 50, while lower pulling lines 40c, 40d extend to a lower position on the respective tower 20, 26 and turbine assembly 50. Any connection arrangement of the pulling lines 40 to the line pulling device(s) 44, towers 20, 26 and turbine assembly 50 capable of assisting in up-righting the turbine assembly 50 may be used. For example, at the respective tower 20, 26, each line 40 of this embodiment engages a fairleader 30 (FIG. 8) movable in at least two directions to allow changes of direction of the pulling lines 40 during up-righting operations. The fairleaders 30 may be any suitable devices capable of engaging and allowing the change of direction or orientation of the pulling lines 40.

Figure 5:
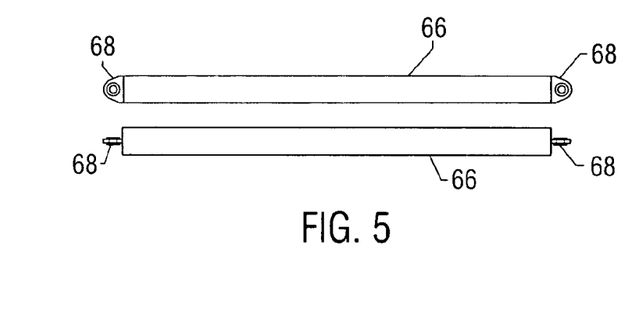
FIG. 5 includes top and side views of an embodiment of a pin-type turbine connector in accordance with the present invention.

At the turbine assembly 50, the illustrated pulling lines 40 are releasably connectable to the connectors 60, 62. The upper pulling lines 40a, 40b are shown engaged with an upper connector 60 and the lower pulling lines 40c, 40d are shown engaged with a lower connector 60. In this example, each connector 60, 62 is a pin 66 extendable through and freely rotatable within a passageway (not shown) formed in the pillar 51 of the turbine assembly 50. If desired, the turbine pillar 51 may be reinforced around the passageways. Each end of the exemplary pin 66 includes a loop or padeye 68 (FIG. 5) engageable by a line 40 either directly or via a coupler, such as a shackle (not shown). Accordingly, the pins 66 are rotatable relative to the turbine assembly 50 to allow movement of the turbine assembly 50 into an up-right position with the use of the lines 40. When included, the pins 66, padeyes 68 and shackles (not shown) may take any suitable form, configuration and construction. For example, the pins 66 may be constructed from 10"–12" diameter carbon steel bar stock. However, the connector(s) 60 may take any other suitable form. For example, the connector 60 may be a reinforced rotatable loop member that is integral to the pillar 51.

An example method of up-righting a wind turbine assembly at an offshore location will now be described. The turbine assembly could be balanced onshore, such as with the use of counterweights, to enable it to hang vertically during up-right operations. Referring to the embodiment of FIGS. 4 and 6, if assembled onshore, the turbine assembly 50 may be loaded directly onto the up-righting barge 10. For example, the turbine assembly 50 may be rolled onto the turbine holders 14 with the use of one or more large capacity low-boy. Alternately, the turbine assembly 50 may be loaded onto a transport barge or other transporter (not shown) and later loaded onto the barge 10 at an offshore location. For example, a small derrick barge or other device (not shown) may be used to lift the turbine assembly 50 from the transporter onto the turbine holders 14 of the barge 10. However, the present invention is not limited to on-shore assembly of the turbine assembly 50 or any particular techniques, equipment, locations or steps for loading the turbine assembly 50 onto the up-righting barge 10.

Figure 6:
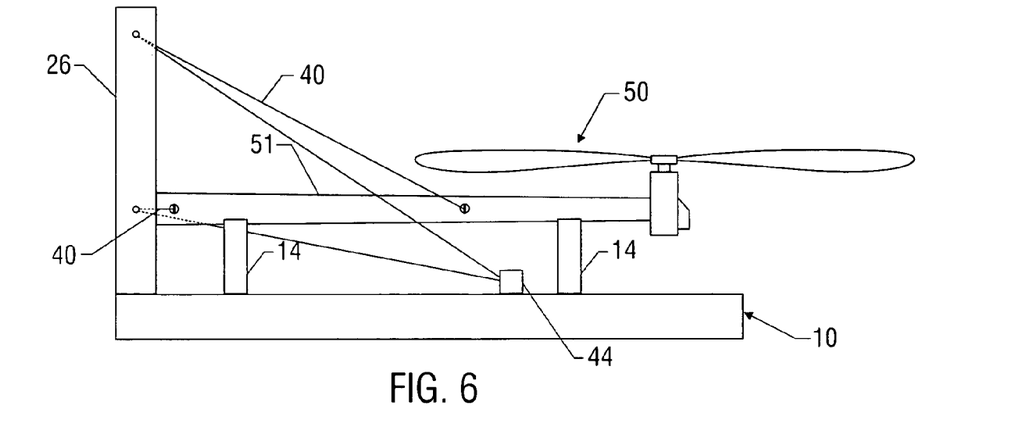
FIG. 6 is a side elevation view of the embodiment of FIG. 4.

After being placed onto the barge 10, the turbine assembly 50 is secured to the barge 10. In the embodiment of FIGS. 4 and 6, this may include rigging up the pulling lines 40, where the upper pulling lines 40a, 40b are extended from the towers 20, 26 to opposing ends of the upper connector 60, and the lower pulling lines 40c, 40d are extended from the towers 20, 26 to opposing ends of the lower connector 62. It may be necessary to tighten the pulling lines 40 at the pulling devices 44 to remove slack and prevent kinking, if desired. The use of one or more additional support member (e.g. support arm 80 in FIG. 2) may also be necessary or desired to assist in supporting and stabilizing the turbine assembly 50 on the barge 10. Other seafastening of the turbine assembly 50 and all other items should be performed as necessary or desired.

Still referring to the example of FIGS. 4 and 6, at the offshore erection site, the up-righting barge 10 is preferably positioned so that the open area 16 is directly over the desired erection location of the turbine assembly 50. In this scenario, the towers 20, 26 of the barge 10 thus essentially straddle the desired erection location. Typically, the erection location will be the location of a turbine foundation (not shown) upon which the turbine assembly 50 will be mounted. However, the use or positioning of a turbine foundation is not limiting upon the present invention. Moreover, the time when the barge 10 is positioned over the desired erection location may vary depending upon particular circumstances or desires.

The barge 10 may be secured in position using any suitable desired technique and equipment, as is or becomes known. For example, the barge 10 may be moor-anchored, jack-up anchored or spud anchored. If the turbine assembly 50 is not yet on the barge 10, it is placed on the barge 10, such as previously described.

Figure 7:
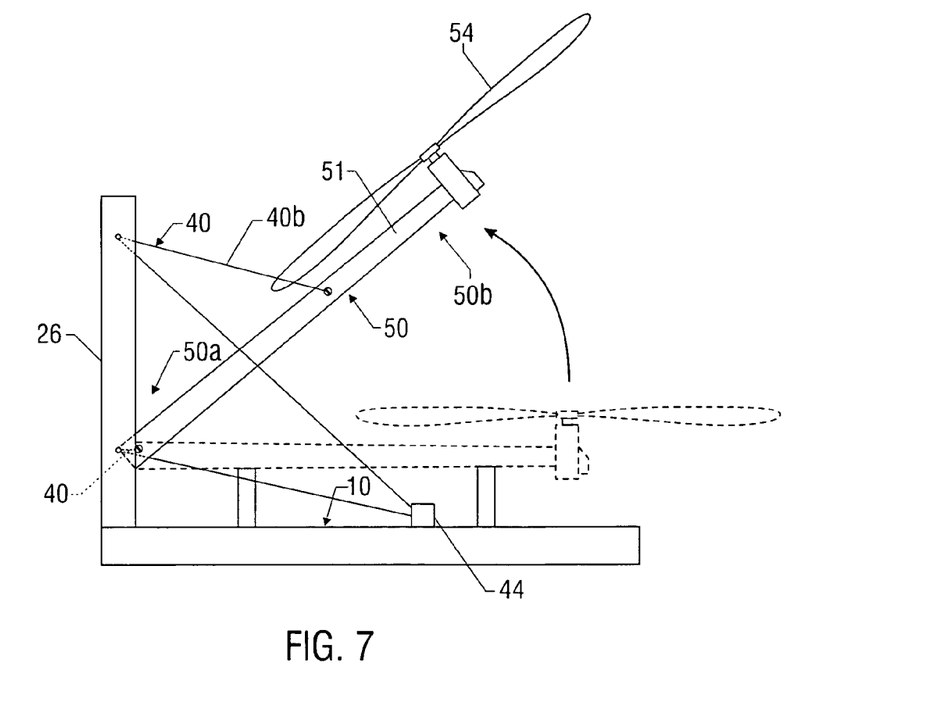
FIG. 7 is a side elevation view of the embodiment of FIG. 4 showing an example wind turbine assembly being up-righted in accordance with the present invention.

Referring to FIG. 7, the turbine assembly 50 of this embodiment is up-righted by manipulating the pulling lines 40. For example, the lower pulling lines 40c, 40d may be pulled via the line pulling devices 44 as necessary to move the bottom end 50a of turbine assembly 50 in position between the towers 20, 26 into, or over, the open area 16. In other embodiments, such as shown in FIG. 2, the bottom end 50a of the turbine assembly 50 may already be positioned between the towers 20, 26, requiring less or no manipulation of the lower pulling lines 40c, 40d.

The upper pulling lines 40a, 40b of this example are pulled via the line pulling devices 44 as necessary to raise the upper end 50b of the turbine assembly 50 over its bottom end 50a or the open area 16. Using this particular embodiment, the turbine assembly 50 is thus generally suspended on and pivotable about the lower pin 62. During up-righting, the exemplary pulling lines 40 will generally remain aligned with the pin padeyes 68 in all pertinent directions of movement.

During up-righting, it may be necessary to tighten and loosen the pulling lines 40a–*d* at different times and by varying degrees to ensure proper movement and positioning of the turbine assembly 50 between the towers 20, 26. If desired, air tuggers (not shown) may be located on the sides 10a, 10b of the barge 10 for laterally stabilizing the turbine assembly 50 during up-righting. If the barge 10 includes jack-up legs (not shown), the geometry of the barge 10 may be designed so that the turbine rotor 54 passes over the jack-up legs during up-righting of the turbine assembly 50.

Figure 8:
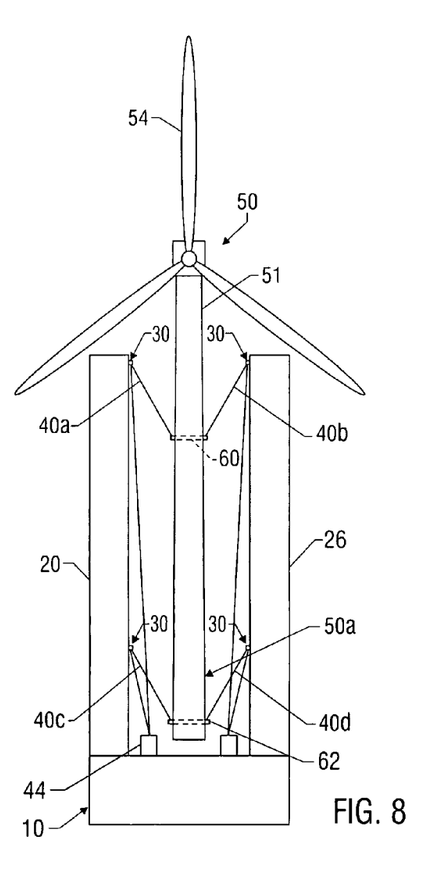
FIG. 8 is a side elevation view of the embodiment of FIG. 4 showing an example wind turbine assembly in a vertical position after being up-righted in accordance with the present invention.
Figure 9:
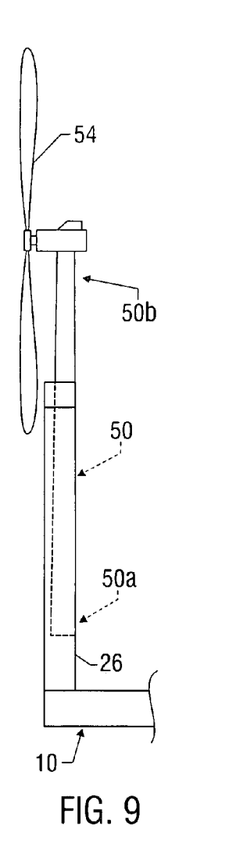
FIG. 9 is an end view of the embodiment of FIG. 8.

FIGS. 8 and 9 show the turbine assembly 50 of this embodiment in a generally up-right position. After up-righting, the lines 40a–*d* are held in position or further manipulated as necessary to retain or achieve the desired alignment of the upper and bottom ends 50b, 50a of the turbine assembly 50 over the desired installation location. The upright turbine assembly 50 may be lowered (not shown) for offshore installation by paying-out the pulling lines 40a–*d*. For example, the turbine assembly 50 may be lowered as necessary to set the bottom end 50a of the turbine assembly 50 onto a turbine foundation (not shown). After the turbine assembly 50 is secured at the offshore installation location, the pulling lines 40a–d of this example are removed.

If desired, the turbine assembly 50 may instead be placed and carried on the barge 10 in a partially or fully disassembled configuration for any suitable reason. For example, in the embodiment of FIG. 10, the turbine pillar 51, rotor 54 and nacelle 56 are separately carried on the barge 10. The pillar 51 is shown carried on rollers 82, as discussed earlier. The rotor 54 is carried on a pair of supports, or mounts, 84 extending from the towers 20, 26. The exemplary supports 84 are padded steel brackets, but may take any suitable form. The nacelle 56 is suitably tied down (not shown) to the deck of the barge 10. With such an arrangement, it may be desirable, for example, to connect the rotor 54 and nacelle 56 after up-righting the pillar 51 and installing it in a turbine foundation at an offshore location. However, the turbine assembly 50 may be disassembled and carried on the barge 10 in any other desired manner and for any other reason(s).

If desired, the barge 10 may be equipped with one or more lifting device useful for installing a turbine foundation (not shown), loading the turbine assembly 50 onto the barge 10, assembling the turbine assembly 50, up-righting the turbine assembly 50, maintenance, repair and removal of the turbine assembly 50 or its parts, or any combination thereof. For example, the embodiment of FIGS. 10–14 includes a hanging rotating derrick crane 90 disposed upon each tower 20, 26. However, other embodiments may include only a single crane or lifting device disposed at any desired location on the barge 10.

The illustrated cranes 90 are capable of hanging over the side of the barge 10 and being used for any one or more of the aforementioned activities. For example, the cranes 90 may be used to lift the foundation (not shown) from the barge 10 or another structure or vessel (not shown), position and lower it between the towers 20, 26 and install foundation pilings (not shown). The cranes 90 of this embodiment may also, or instead, be used to assist in loading the turbine assembly 50 or components onto the barge 10. In FIG. 10, the crane(s) 90 may be used to assist in placing the turbine pillar 51 onto the rollers 82, load the turbine rotor 54 onto the mounts 84 and place the turbine nacelle 56 onto the barge deck or other location.

Figure 11:
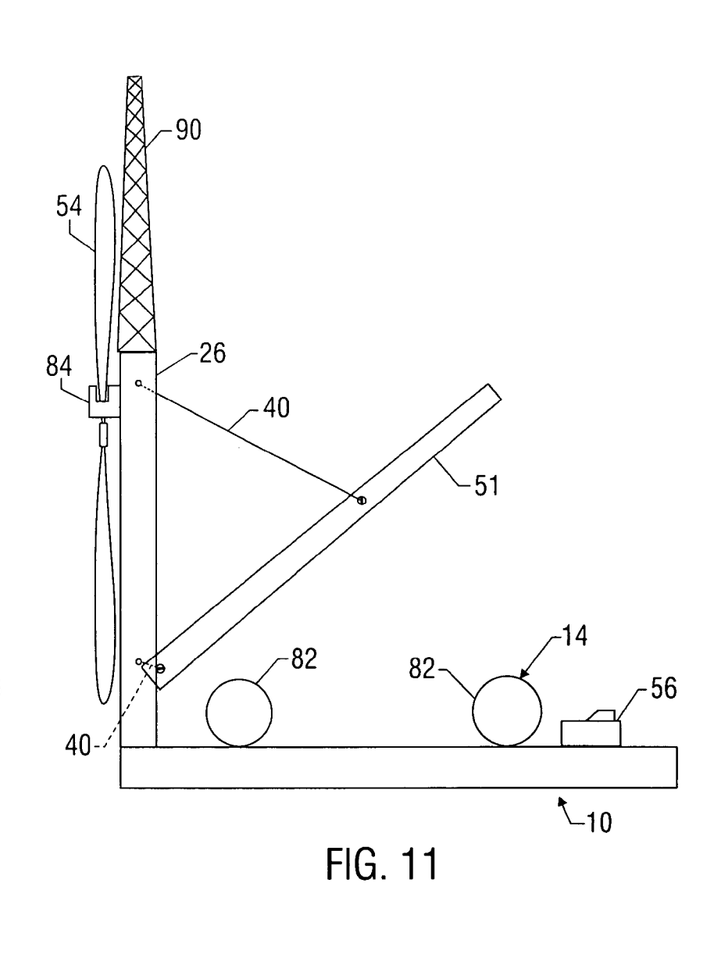
FIG. 11 is a side elevation view of the embodiment of FIG. 10 showing an example wind turbine pillar being up-righted in accordance with the present invention.
Figure 12:
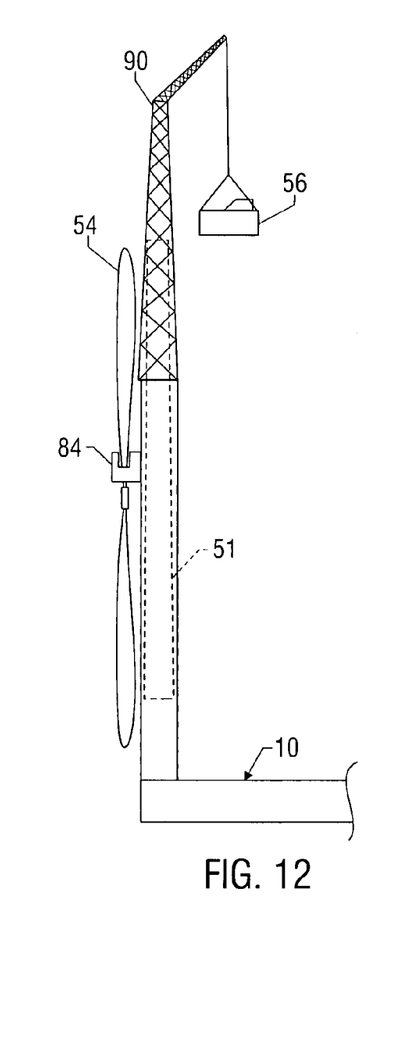
FIG. 12 is a side elevation view of the embodiment of FIG. 10 showing an example wind turbine pillar in a vertical position after being up-righted and an example turbine nacelle being connected to the pillar in accordance with the present invention.
Figure 13:
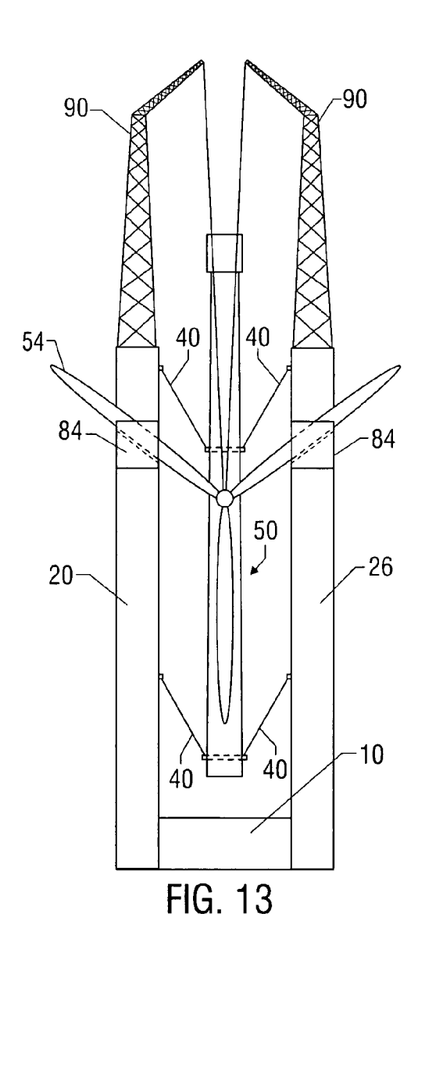
FIG. 13 is an end view of the embodiment of FIG. 12 showing an example turbine rotor being installed onto the nacelle.
Figure 14:
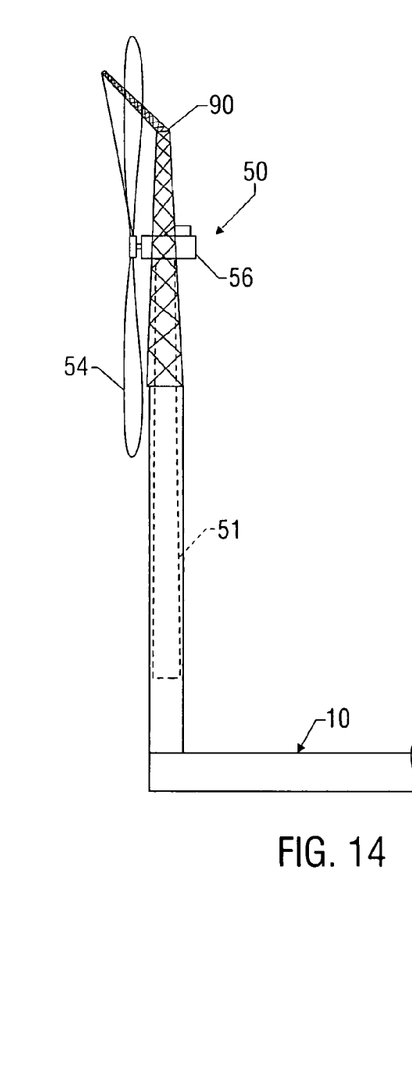
FIG. 14 is side elevation view of the embodiment of FIG. 13 showing the turbine rotor mounted on the nacelle.

Further, the illustrated cranes 90 may be used to assist in up-righting and assembling the turbine assembly 50. While the turbine pillar 51 is shown in FIG. 11 being up-righted using the pulling lines 40 such as previously described, the crane(s) 90 may be used instead or in addition. In the example shown in FIG. 12, after the pillar 51 is up-righted, one or more of the cranes 90 lifts the nacelle 56 and positions it for connection to the pillar 51. In FIGS. 13 and 14, the cranes 90 are shown lifting and mounting the turbine rotor 54 onto the nacelle 56. The illustrated cranes 90 may later be used to assist in the maintenance, repair, replacement and removal of the rotor 54, nacelle 56 and pillar 51, as well as other components.

Preferred embodiments of the present invention thus offer advantages over the prior art and are well adapted to carry out one or more of the objects of the invention. However, the present invention does not require each of the components and acts described above. Any one or more of the above components, features and processes may be employed in any suitable configuration without inclusion of other such components, features and processes. The present invention is thus not limited to the above-described embodiments and methods of operation. Moreover, while preferred embodiments of this invention have been shown and described, many variations, modifications and/or changes of the system, apparatus and methods of the present invention, such as in the components, details of construction and operation, arrangement of parts and/or methods of use, are possible, contemplated by the patentee, within the scope of the appended claims, and may be made and used by one of ordinary skill in the art without departing from the spirit or teachings of the invention and scope of appended claims. For example, in some embodiments, the tower(s), lifting device(s) and/or other components as described or shown herein may, if desired, be temporarily attachable to an existing vessel and may be removable or retractable. Accordingly, additional features, capabilities, components, functions, methods, uses and applications may be included.

The methods described above and any other methods which may fall within the scope of any of the appended claims can be performed in any desired suitable order and are not necessarily limited to the sequence described herein or as may be listed in any of the appended claims. Furthermore, the methods of the present invention do not require use of the particular components or embodiments shown and described in the present specification, but are equally applicable with any other suitable structure, form and configuration of components. Thus, all matter herein set forth or shown in the accompanying drawings should be interpreted as illustrative and not limiting, and the scope of the invention and the appended claims is not limited to the embodiments described and shown herein.

The invention claimed is:

1. An apparatus useful for up-righting a wind turbine assembly at an offshore installation location, the apparatus comprising:
    a barge having first and second ends and being capable of carrying the wind turbine assembly;
    first and second towers disposed at said first end of said barge;
    an open area disposed between said first and second towers and extending downwardly to the offshore installation location; and
    at least two pulling lines each engageable between at least one of said first and second towers and at least part of the wind turbine assembly, said at least two pulling lines being useful to assist in moving at least part of the wind turbine assembly into a generally up-right orientation between said first and second towers and lowering the wind turbine assembly downwardly through the open area to the offshore installation location.

2. The apparatus of claim 1 wherein the wind turbine assembly includes a pillar, further including at least one connector associated with and rotatable relative to the pillar and engageable with at least one said pulling line.

3. The apparatus of claim 2 wherein said at least one connector includes multiple connectors disposed at different locations along the length of the pillar.

4. The apparatus of claim 3 wherein said multiple connectors includes at least first and second pins, each said pin being disposed and rotatable within a passageway in the pillar and having first and second ends, said first and second ends of each of said first and second pins being engageable with at least one said pulling line, said at least one pulling line being capable of assisting in moving the pillar into a generally up-right orientation.

5. The apparatus of claim 4 wherein the pillar has an upper end and a lower end, wherein said first pin is located between the lower end of the pillar and said second pin, whereby said first pin at least partially supports the pillar when the pillar is being moved into a generally up-right orientation.

6. The apparatus of claim 5 wherein the pillar is at least partially pivoted about said first pin when the pillar is being moved into a generally up-right orientation.

7. The apparatus of claim 3 further including first and second fairleaders disposed upon said first tower and third and fourth fairleaders disposed upon said second tower, each said fairleader being engageable with one of said pulling lines.

8. The apparatus of claim 3 further including at least one turbine holder disposed upon said barge and capable of supporting at least part of said turbine assembly.

9. The apparatus of claim 8 wherein said at least one turbine holder includes a cradle.

10. The apparatus of claim 8 wherein said at least one turbine holder includes a roller.

11. A system useful for assisting in up-righting an elongated wind turbine pillar on a floating vessel at an offshore location, the floating vessel having at least one tower, the system comprising:
at least two pins, each said pin extending through and being rotatable within a different passageway in the turbine pillar;
each said passageway being disposed in the pillar at a different height of the pillar;
each said pin having a coupler at each end; and
at least two pulling lines, each said pulling line being engageable between a different coupler of said pins and the at least one tower of the vessel, whereby said at least two pulling lines are useful to assist in moving the pillar into a generally up-right position at the offshore location.

12. The system of claim 11 wherein the floating vessel includes first and second towers disposed on opposing sides of the vessel at the same end of the vessel and an open area disposed between said first and second towers and extending downwardly to the offshore installation location.

13. The system of claim 12 wherein the pillar has an upper end and a lower end, wherein a first said pin is located between the lower end of the pillar and a second said pin, whereby said first pin at least partially supports the pillar when the pillar is being moved into a generally up-right position.

14. The system of claim 13 wherein the pillar is at least partially pivoted about said first pin when the pillar is being moved into a generally up-right position.

15. The system of claim 12 further including at least one turbine rotor mount extending from at least one of said first and second towers, said at least one turbine rotor mount capable of at least partially carrying a wind turbine rotor connectable to the turbine pillar.

16. The system of claim 12 wherein the vessel includes at least one lifting device capable of at least one among lifting and installing a turbine foundation at an offshore location, lifting and loading an assembled turbine assembly onto the vessel, lifting and loading a turbine pillar onto the vessel, lifting and moving a turbine nacelle for connection or disconnection with a turbine pillar and lifting and moving a turbine rotor for connection or disconnection with a turbine nacelle.

17. A method for installing a wind turbine assembly at an offshore installation location from a barge, the wind turbine assembly including a turbine pillar, the method comprising:
forming first and second towers at one end of the barge;
forming an open area between the towers that extends downwardly to the offshore installation location;
placing the wind turbine pillar on the barge in a non-upright position;
engaging at least a first pulling line between the first tower and the turbine pillar;
engaging at least a second pulling line between the second tower and the turbine pillar;
pulling at least one pulling line to draw the turbine pillar into a generally up-right position between the towers and in or over the open area; and
lowering the turbine pillar to the offshore installation location.

18. The method of claim 17 further including connecting a turbine nacelle to the turbine pillar and connecting a turbine rotor to the turbine nacelle before the turbine pillar has been moved into an up-right position.

19. The method of claim 17 further including connecting a turbine nacelle to the turbine pillar and connecting a turbine rotor to the turbine nacelle after the turbine pillar has been at least partially lowered to the offshore installation location.

20. The method of claim 17 further including
associating at least two connectors with the pillar, each connector being rotatable relative to the pillar, and
engaging at least one pulling line with each connector.

21. The method of claim 20, wherein each connector is a pin, further including
disposing each pin within a different passageway extending at least partially through the width of the pillar,
locating a first pin between the bottom end of the pillar and a second connector, and
pulling at least one pulling line to generally pivot the pillar about the first connector to assist in moving the pillar into a generally upright position.

22. The method of claim 21 further including engaging a first pulling line from a low position on the first tower to one end of the first pin, engaging a second pulling line from a low position on the second tower to the other end of the first pin, engaging a third pulling line from a high position on the first tower to one end of the second pin and engaging a second pulling line from a high position on the second tower to the other end of the second pin.

23. The method of claim 22 further including engaging each pulling line with at least one winch disposed upon the barge and through at least one fairleader connected with one of said first and second towers.

24. The method of claim 17 further including positioning the open area over the offshore installation location and securing the position of the barge.

25. The method of claim 24 further including using a lifting device disposed upon the barge to perform at least one among installing a turbine foundation at the offshore installation location, lifting and moving a turbine nacelle for connection or disconnection with the turbine pillar at an offshore location, and lifting and moving a turbine rotor for connection or disconnection with the turbine pillar at an offshore location.

* * * * *